A. E. BEALL & C. F. SKELLENGER.
VEHICLE WHEEL.
APPLICATION FILED AUG. 26, 1910.
1,006,525.
Patented Oct. 24, 1911.
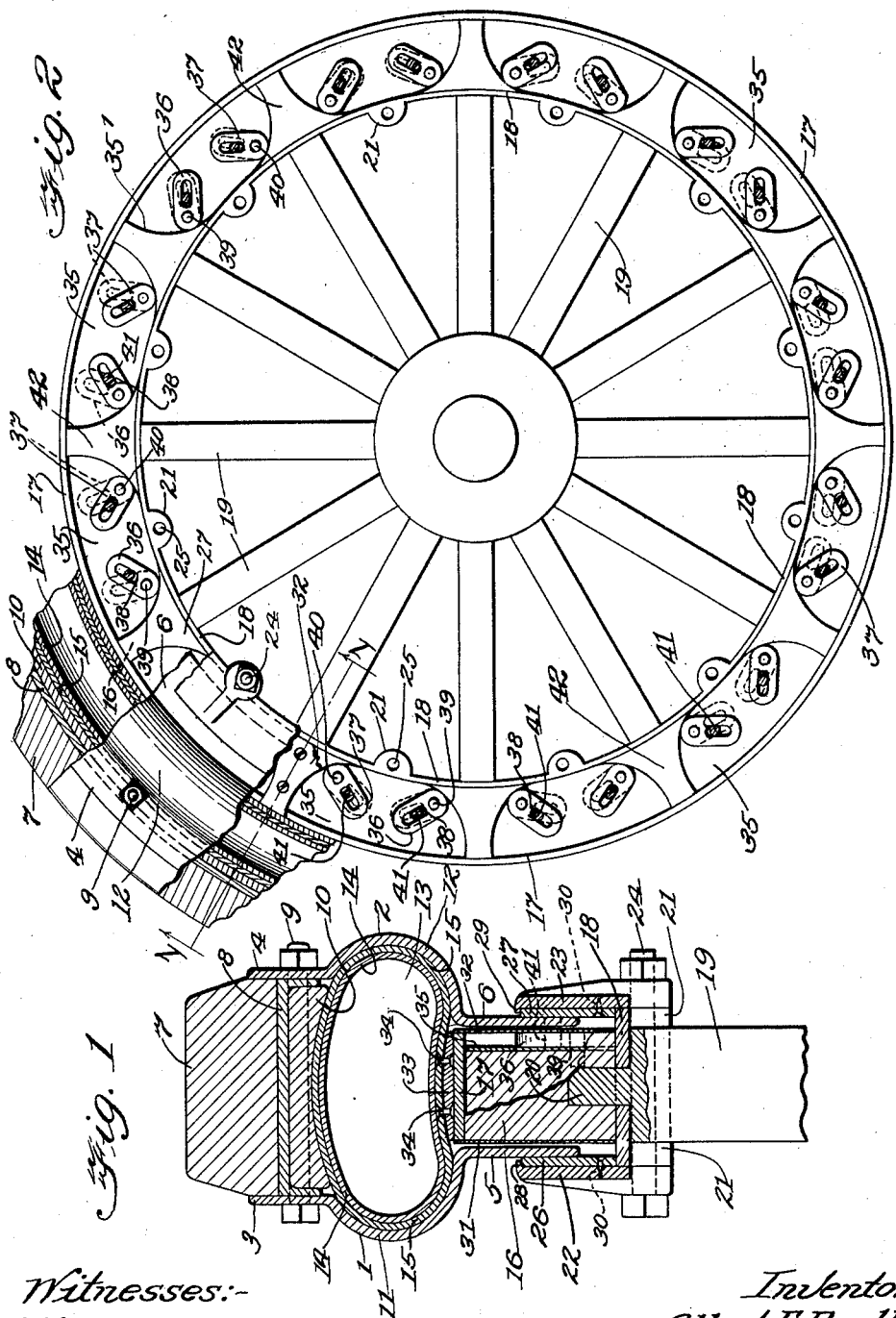
Witnesses:-
Urw. H. Yagle
A. A. Thomas
Inventors:-
Albert E. Beall.
Charles F. Skellenger
by Wallace R. Lane
Atty.

UNITED STATES PATENT OFFICE.

ALBERT E. BEALL AND CHARLES F. SKELLENGER, OF CLINTON, IOWA, ASSIGNORS TO IOWA MOTOR WHEEL COMPANY, A CORPORATION OF ARIZONA TERRITORY.

VEHICLE-WHEEL.

1,006,525.  Specification of Letters Patent.  Patented Oct. 24, 1911.

Application filed August 26, 1910. Serial No. 579,116.

*To all whom it may concern:*

Be it known that we, ALBERT E. BEALL and CHARLES F. SKELLENGER, citizens of the United States, residing at Clinton, county of Clinton, and State of Iowa, have invented a certain new and useful Vehicle-Wheel, of which the following is a specification.

Our invention relates to vehicle wheels, and has for its object the provision of a tire which is compact in construction and effectively takes up the shocks and jolts caused by the unevenness of road beds. Furthermore, the arrangement of the parts that go to make up the tire, is such that the pneumatic tube is thoroughly protected against injury.

In the accompanying drawings: Figure 1 is a cross-sectional view, substantially on line 1—1 of Fig. 2, of our new form of tire applied to the felly of the wheel, certain parts being broken away to expose other parts; and Fig. 2 is a side view of the wheel showing a portion of the tire and the link connections between the felly and the tire.

Referring to the drawings in detail, the tire comprises a pair of metal side members indicated as a whole by 1 and 2, which may either be built up of curved sections or constructed each of one annular piece. These side members are provided with outer flanges 3 and 4 and inner flanges 5 and 6. Between the outer flanges is secured the tread rim 7, which is of yieldable material, such as hard rubber. The tread rim 7 has secured thereto the inner metal ring 8 through which the fastening bolts 9 pass between the outer flanges. The ring 8 being in the form of an annular channel, the space within the ring between the bolts is preferably filled in with wood or similar material, as indicated at 10. The side members have outwardly curved portions 11 and 12 between the outer and inner flanges, so as to form an annular chamber 13 in which is housed a pneumatic tube 14. A lining or jacket 15 of some such material as leather, is interposed between the tube and the metallic side members. The felly comprises a solid non-metallic body portion 16, preferably of wood, which is provided with an outer metallic rim 17 and an inner metallic ring 18. The spokes 19 have reduced extensions 20 which are inserted into openings in the felly, as indicated in Fig. 1. The ring 18 is provided with radial lugs 21, as best shown in Fig. 2. Radially-extending retaining pieces 22 and 23 are secured to the felly by means of bolts or other fastening means 24 passing through the openings 25 in the lugs 21 and through the retaining pieces, as shown in Fig. 2. These retaining pieces are spaced from the felly by the width of the ring 18, and are provided with inner linings 26 and 27, as of leather. To retain the linings firmly in place the retaining pieces are provided with lugs 28 and 29 which extend over the lining. As additional means for securing the linings in place screws 30 may be used. The inner flanges 5 and 6 of the metal side members 1 and 2, extend loosely into the space between the retaining members and the felly and are adapted to move up and down in said space during the operation of the wheel. Wear between the parts is reduced by the non-metallic linings 26 and 27 which the flanges 5 and 6 frictionally engage. If desired, a non-metallic lining may be secured to the sides of the felly, as indicated at 31 and 32. A filling 33, as of fiber, is secured to the lining 15 over the metal rim 17, by means of rivets 34, or in any other suitable way. The loose connection between the tire and the felly is shown in Fig. 2.

A plurality of metal plates 35 are sunk into recesses 35′ provided on one side of the felly, preferably on the back side of the wheel. In Fig. 2 these plates are shown inserted on the felly between each pair of spokes, but the number of these plates may be varied. Each plate has pivoted thereto a pair of links 36 and 37 provided each with a slot 38. The links are pivoted to studs 39 and 40 on each plate. One of the inner flanges of the side members 1 and 2 is provided with a series of lugs 41, which are indicated in cross-section in Fig. 2 and in dotted lines in Fig. 1. There is a lug 41 accompanying each link and these lugs are adapted to move in the slots 38 of the links. In Fig. 2 the full line position of the links is the position which the links assume when there is no weight on the wheel. In other words, the full line position of the links in Fig. 2 is their normal position. Under the weight of the machine, the tire which loosely surrounds the felly will assume a position eccentric with respect to the felly and the links will assume the position indicated in dotted lines in Fig. 2. As the wheel rolls along, the links change their position, accommodating themselves to the position of the tire on the felly. The packing 32 on the rear side of the wheel is secured to the portions 42 which separate the recess 35.

Having thus described our invention, what we claim as new and desire to secure by Letters Patent of the United States is:

1. In a vehicle wheel, the combination of a felly provided with recesses in one of its sides, a tire loosely surrounding said felly, a plurality of slotted links pivoted to said felly in said recesses, and pins on said tire for engaging the slots in the links.

2. In a vehicle wheel, the combination of a felly provided with recesses in one of its sides, a tire on said felly having a pair of flanges which extend inwardly over the felly, metal plates in each of said recesses, slotted links pivoted to said plates, and pins on said tire for engaging the slots in the links.

3. In a vehicle wheel, the combination with a felly, comprising a solid non-metallic body portion, a metal rim secured to the inner periphery of said body portion, said inner rim being provided with radial lugs, retaining pieces bolted to said lugs and spaced from the body of the felly, of a tire on said felly having a pair of flanges which extend loosely into the space between the felly and said retaining pieces, and means for yieldably connecting the tire to the felly.

4. In a vehicle wheel, the combination of a felly consisting of a solid ring in which the outer ends of the spokes terminate, a tire having an annular portion which rests against the outer periphery of the felly and a pair of flanges which extend inwardly beyond said annular portion and over the felly, a plurality of slotted links pivoted to said felly, and pins on said tire which engage the slots in the links.

5. In a vehicle wheel, the combination of a felly consisting of a solid ring in which the outer ends of the spokes terminate, a tire having an annular portion which rests against the outer periphery of the felly, said tire having metallic side members provided with flanges which extend inwardly beyond said annular portion and over the felly, a plurality of slotted links pivoted to said felly, and pins on one of said side members for engaging the slots in the links.

6. In a vehicle wheel, the combination with a felly consisting of a solid ring in which the outer ends of the spokes terminate, of a tire yieldably surrounding said felly, said tire comprising a pair of metallic side members provided with outer and inner flanges, a solid tread-rim secured between said outer flanges, said inner flanges extending upon either side of the felly, yieldable connections between said felly and one of said inner flanges to permit movement of said side members relative to the felly, said side members having outwardly curved walls between the outer and inner flanges, said walls forming an annular chamber between the solid tread-rim and the felly, and a pneumatic tube within said chamber, the inner periphery of said tube resting against the outer periphery of the felly.

7. In a vehicle wheel, the combination with a felly consisting of a solid ring in which the outer ends of the spokes terminate, of a tire yieldably surrounding said felly, said tire comprising a pair of metallic side members provided with outer and inner flanges, a solid tread-rim secured between said outer flanges, said inner flanges extending upon either side of the felly, said side members having outwardly curved walls between the outer and inner flanges, said walls forming an annular chamber between the solid tread-rim and the felly, a pneumatic tube within said chamber, the inner periphery of said tube resting against the outer periphery of the felly, and a plurality of slotted link-connections between the felly and one of the side members of said tire.

8. In a vehicle wheel, the combination of a felly, retaining pieces secured to opposite sides of the felly and spaced therefrom, said felly extending radially beyond said retaining pieces, a tire provided with a pair of side members which have outwardly curved portions extending laterally beyond said retaining pieces, flanges on said side members extending loosely into the spaces between said felly and said retaining pieces, a pneumatic tube held between said outwardly curved portions, and means for yieldably connecting the tire to the felly.

9. In a vehicle wheel, the combination with a felly having retaining pieces secured upon opposite sides thereof and spaced therefrom, said felly extending radially beyond said retaining pieces, of a tire comprising a pair of metallic side members having outer and inner flanges, a tread-rim of yieldable non-metallic material engaged on its exterior by said outer flanges and clamped between the same, said inner flanges extending loosely into the space between the felly and the retaining pieces, said side members having outwardly curved portions between said outer and inner flanges, said curved portions extending laterally beyond said retaining pieces, and a pneumatic tube held between said outwardly curved portions.

ALBERT E. BEALL.
CHARLES F. SKELLENGER.

Witnesses:
 ED BURKE,
 FALLE FOGED.

Copies of this patent may be obtained for five cents each, by addressing the "Commissioner of Patents, Washington, D. C."